(12) United States Patent
Munger et al.

(10) Patent No.: US 9,811,347 B2
(45) Date of Patent: Nov. 7, 2017

(54) MANAGING DEPENDENCIES FOR HUMAN INTERFACE INFRASTRUCTURE (HII) DEVICES

(71) Applicant: Dell Products, L.P., Round Rock, TX (US)

(72) Inventors: William C. Munger, Round Rock, TX (US); Sundar Dasar, Round Rock, TX (US); Divya Vijayvargiya, Cedar Park, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 14/967,431

(22) Filed: Dec. 14, 2015

(65) Prior Publication Data

US 2017/0168845 A1    Jun. 15, 2017

(51) Int. Cl.
| | | |
|---|---|---|
| *G06F 9/00* | (2006.01) | |
| *G06F 9/44* | (2006.01) | |
| *G06F 1/32* | (2006.01) | |
| *H04L 12/931* | (2013.01) | |

(52) U.S. Cl.
CPC .......... *G06F 9/4406* (2013.01); *G06F 1/3203* (2013.01); *H04L 49/352* (2013.01)

(58) Field of Classification Search
CPC .................................. G06F 13/00; G06F 9/00
USPC ....................................................... 713/1, 2
See application file for complete search history.

(56) References Cited

U.S. PATENT DOCUMENTS

| | | | | |
|---|---|---|---|---|
| 7,711,758 B1* | 5/2010 | Gillespie | ............... | G06F 9/4443 707/690 |
| 8,522,005 B2* | 8/2013 | Mahmoud | ............. | G06F 9/4413 707/708 |
| 8,903,967 B2* | 12/2014 | Murphy | .................. | G06F 8/665 709/221 |
| 2005/0144428 A1* | 6/2005 | Rothman | .............. | G06F 9/4411 713/1 |
| 2007/0038788 A1* | 2/2007 | Iwanojko | ............ | G06F 9/44505 710/100 |
| 2013/0091260 A1* | 4/2013 | Murphy | .................. | G06F 8/665 709/221 |
| 2016/0110207 A1* | 4/2016 | Herzi | .................. | G06F 9/44505 713/1 |
| 2016/0202970 A1* | 7/2016 | Das | .......................... | G06F 8/74 717/123 |

* cited by examiner

*Primary Examiner* — Vincent Tran
(74) *Attorney, Agent, or Firm* — Fogarty LLP

(57) ABSTRACT

Systems and methods for managing dependencies for Human Interface Infrastructure (HII) devices are described. In some embodiments, an Information Handling System (IHS) may include a host processor and a Baseboard Management Controller (BMC) coupled to the host processor, the BMC having program instructions stored thereon that, upon execution by the BMC, cause the BMC to: receive, from another IHS remotely located with respect to the IHS, a request to change a value of a given attribute of a Human Interface Infrastructure (HII) device coupled to the IHS; and use a dependency matrix to determine how the change is affected by a current value of another attribute.

14 Claims, 4 Drawing Sheets

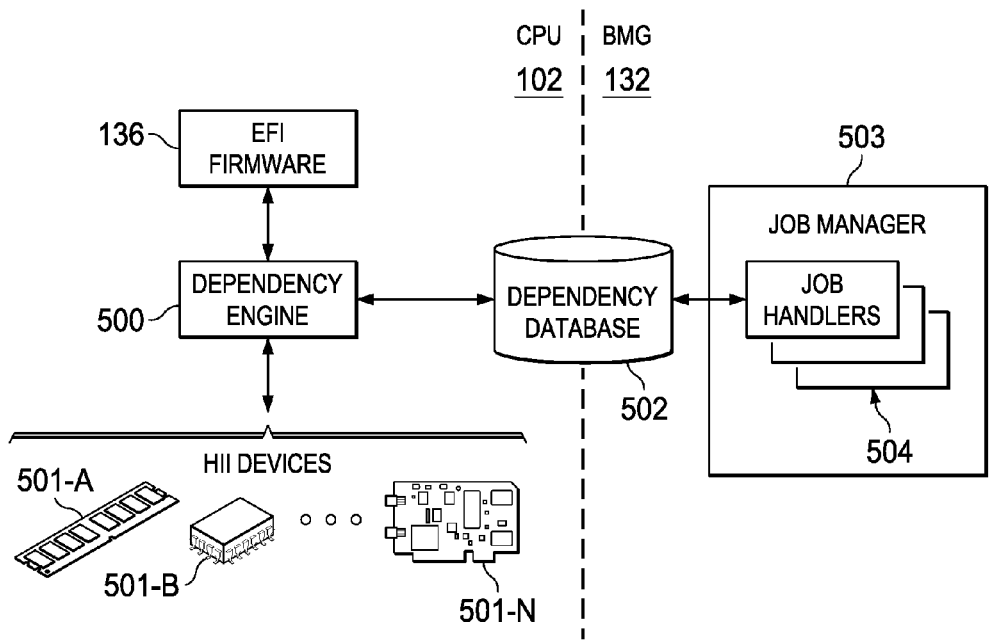
FIG. 5
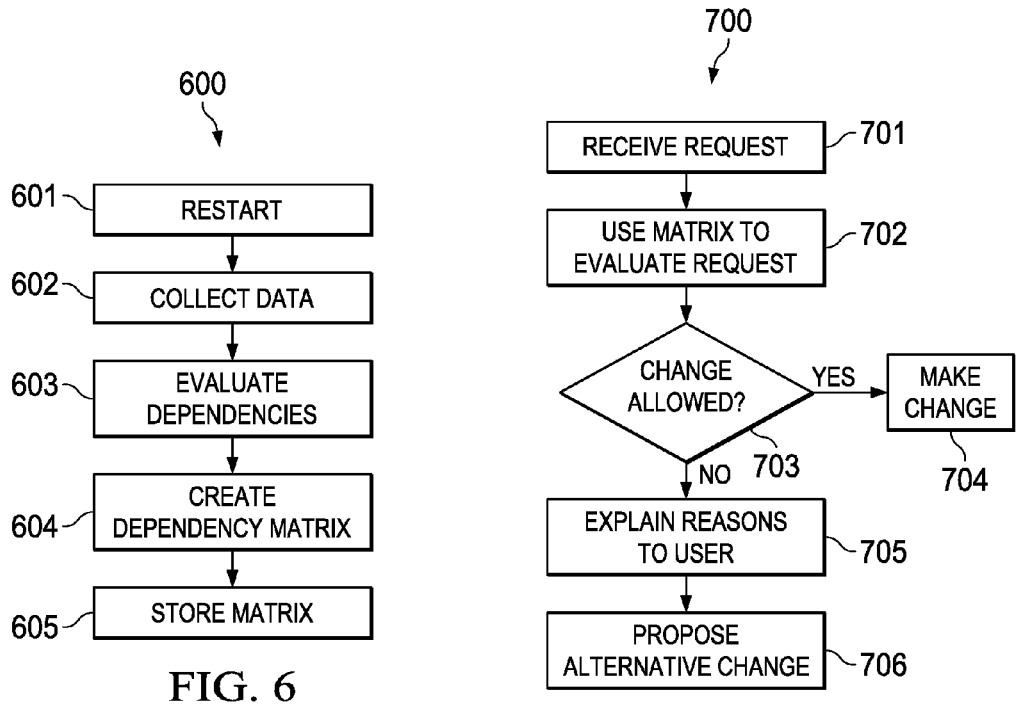
FIG. 6
FIG. 7

MANAGING DEPENDENCIES FOR HUMAN INTERFACE INFRASTRUCTURE (HII) DEVICES

FIELD

This disclosure relates generally to Information Handling Systems (IHSs), and more specifically, to systems and methods for managing dependencies for Human Interface Infrastructure (HII) devices.

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

In most IHSs, low-level code is used as an intermediary between hardware components and the IHS' Operating System (OS) and other high-level software. In some IHSs, this low-level code is known as the Basic Input/Output System ("BIOS"). The BIOS provides a set of software routines that allow high-level software to interact with hardware components using standard calls. Because of limitations of the BIOS in many IHSs, however, a new specification for creating code that is responsible for booting the IHS has been developed that is called the Extensible Firmware Interface ("EFI") Specification, and which has been extended by the Unified Extensible Firmware Interface Forum ("UEFI").

The EFI Specification describes an interface between the OS and the system firmware. In particular, the EFI Specification defines the interface that platform firmware must implement and the interface that the OS may use in booting. How the firmware implements the interface is left up to the manufacturer of the firmware. The EFI Specification also specifies that protocols should be provided for EFI drivers to communicate with each other. An EFI protocol is an interface definition provided by an EFI driver. The EFI core provides protocols for allocation of memory, creating events, setting the clock, and many others.

In order to provide functionality for providing user input and output in an EFI-based firmware, the EFI Specification provides for a Human Interface Infrastructure ("HII") database. The HII database is maintained within EFI and is used to store strings and fonts utilized by drivers executing within the EFI environment. Forms and other user interface properties may also be stored in the HII database. An HII database driver creates and maintains the HII database.

In order to provide access to the HII database to other drivers executing within EFI, the HII database driver exposes an HII database protocol interface. Other drivers executing within EFI can utilize the HII database protocol interface to store and retrieve data in the HII database. For instance, the HII database driver provides functionality for registering packages containing forms, strings, and fonts, and for storing the contents of these packages in the HII database. The HII database driver also provides functions for retrieving information about the data contained in the HII database and the data itself. The HII database protocol interface exposed by the HII database driver is specifically defined in the INTEL Platform Innovation Framework for EFI HII Specification (the "Framework").

SUMMARY

Embodiments of systems and methods for managing dependencies for Human Interface Infrastructure (HII) devices are described herein.

In an illustrative, non-limiting embodiment, an Information Handling System (IHS) may include a host processor and a Baseboard Management Controller (BMC) coupled to the host processor, the BMC having program instructions stored thereon that, upon execution by the BMC, cause the BMC to: receive, from another IHS remotely located with respect to the IHS, a request to change a value of a given attribute of a Human Interface Infrastructure (HII) device coupled to the IHS; and use a dependency matrix to determine how the change is affected by a current value of another attribute.

In some implementations, the dependency matrix may include a plurality of rows, each row indicates the given attribute, the value of the given attribute, the other attribute, and the current value of the other attribute, and the value of the given attribute indicates value(s) that the given attribute must have when the other attribute has the current value. Additionally or alternatively, each row may further indicate a read-only or read/write state of the given attribute when the other attribute has the current value. Additionally or alternatively, each row may further indicate a logical device that contains the attribute and a logical device that contains the other attribute. Additionally or alternatively, each row may further indicate a Boolean operator to express a relationship between a given row and a subsequent row in the dependency matrix.

The program instructions, upon execution, may cause the IHS to: transmit a response to the request indicating that the change is not allowed because the other attribute has the current value, and the current value of the other attribute precludes the change. Additionally or alternatively the program instructions, upon execution, may further cause the IHS to: transmit a response to the request suggesting a change to a different attribute.

For example, the other attribute may be a sibling attribute. In some cases, the given attribute is a Fibre Channel over Ethernet (FCoE) offload mode, the other attribute is a network interface card (NIC) mode or a Internet Small Computer System Interface (iSCSI) offload mode, the value of the other attribute is enabled, and the value of the given attribute is disabled.

Additionally or alternatively, other attribute may be a parent or grandparent attribute. In some cases, the given attribute is a collaborative CPU performance control (CollaborativeCpuPerfCtrl) attribute, the other attribute is a CPU Power and Performance Management (ProcPwrPerf) attribute, the value of the other attribute is System demand-based power management (Sysdbpm), and the value of the given attribute is enabled.

The program instructions, upon execution, may further cause the IHS to: use the dependency matrix to determine how the change is affected by yet another current value of yet another attribute related to the other attribute.

In another illustrative, non-limiting embodiment, a Basic I/O System (BIOS) may have program instructions stored thereon that, upon execution by a host processor of an IHS, cause the IHS to: upon restart of the IHS, collect system inventory data from one or more HII devices coupled to the IHS; identify dependency relationships among configuration settings of the HII devices; create, using the dependency relationships, a dependency matrix to determine how a change in a value of a given configuration setting is affected by a current value of another configuration setting; and store the dependency matrix in a memory accessible to a BMC coupled to the host processor.

The dependency matrix may include a plurality of rows, and each row indicates the given configuration setting, the value of the given configuration setting, the other configuration setting, and the current value of the other configuration setting, and the value of the given configuration setting indicates value(s) that the given configuration setting must have when the other configuration setting has the current value. Additionally, each row may indicates a read-only or read/write state of the given configuration setting when the other configuration setting has the current value. Additionally, each row may indicates a logical device that contains the configuration setting and a logical device that contains the other configuration setting.

The program instructions, upon execution, may cause the IHS to: transmit a response to the request indicating that the change is not allowed because the other configuration setting has the current value, and the current value of the other configuration setting precludes the change.

In yet another illustrative, non-limiting embodiment, a method may include transmitting a request to change a value of a given attribute of an HII device coupled to a remote IHS; and receiving, from the IHS, an indication of how the change is affected by a current value of another attribute, wherein the indication is evaluated by a BMC of the remote IHS based upon a dependency matrix created by a BIOS of the remote IHS upon restart of the remote IHS. The dependency matrix may include a plurality of rows, where each row indicates the given attribute, the value of the given attribute, the other attribute, and the current value of the other attribute, and the value of the other attribute indicates value(s) that the given attribute must have when the other attribute has the current value. In various embodiments, each row may further indicate a read-only or read/write state of the given attribute when the other attribute has the current value.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

FIG. 5 is a block diagram of a system for managing dependencies for HII devices according to some embodiments.

FIG. 6 is a block diagram of an example of a method for creating a dependency matrix for Human Interface Infrastructure (HII) devices according to some embodiments.

FIG. 7 is a flowchart of an example of a method for using a dependency matrix for HII devices according to some embodiments.

DETAILED DESCRIPTION

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
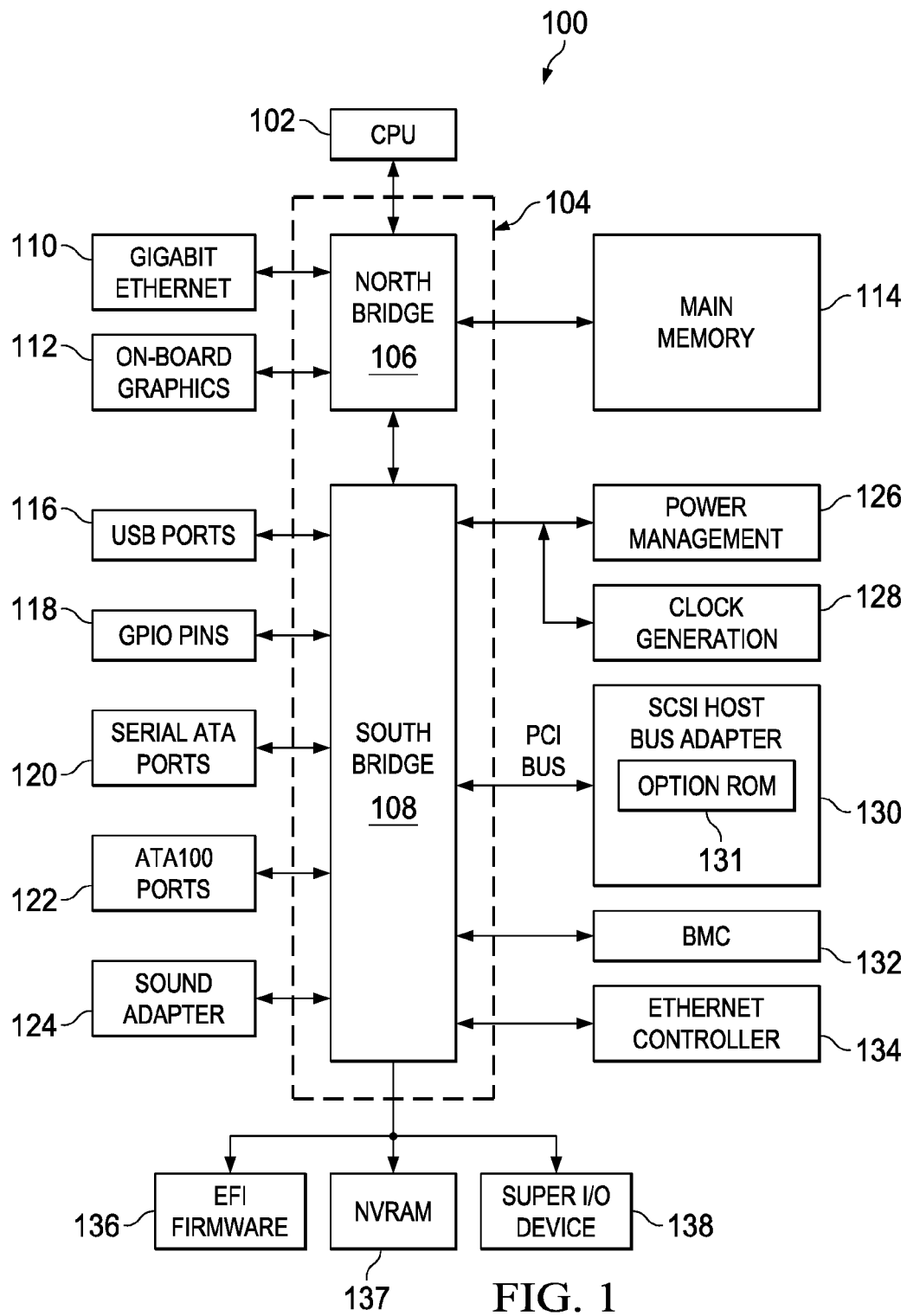
FIG. 1 is a block diagram of an example of an Information Handling System (IHS) configured to implement the systems and methods described herein according to some embodiments.

FIG. 1 shows an example of an IHS configured to implement the systems and methods described herein according to some embodiments. It should be appreciated that although certain embodiments described herein may be discussed in the context of a desktop or server computer, other embodiments may be utilized with virtually any type of IHS. In this example, IHS 100 is configured to manage dependencies for Human Interface Infrastructure (HII) devices, as explained in more detail below.

Particularly, IHS 100 includes a baseboard or motherboard, which is a printed circuit board (PCB) to which components or devices are coupled by way of a bus or other electrical communication path. For example, central processing unit ("CPU") 102 operates in conjunction with a chipset 104; CPU 102 is a standard central processor that performs arithmetic and logical operations necessary for the operation of IHS 100.

Chipset 104 includes northbridge 106 and southbridge 108. Northbridge 106 provides an interface between CPU 102 and the remainder of IHS 100. Northbridge 106 also provides an interface to a random access memory (RAM) used as main memory 114 in IHS 100 and, possibly, to on-board graphics adapter 112. Northbridge 106 may also be configured to provide networking operations through Ethernet adapter 110. Ethernet adapter 110 is capable of connecting IHS 100 to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of IHS 100. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of IHS 100. Power management circuitry 126 and clock generation circuitry 128 may also be utilized during the operation of southbridge 108.

Southbridge 108 is further configured to provide one or more interfaces for connecting mass storage devices to IHS 100. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs. An OS comprises a set of programs that control operations of IHS 100 and allocation of resources. An application program is software that runs on top of the OS and uses computer resources made available through the OS to perform application specific tasks desired by the user.

Mass storage devices connected to southbridge 108 and SCSI host bus adapter 130, and their associated computer-readable media provide non-volatile storage for IHS 100. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS 100. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count ("LPC") interface may also be provided by southbridge 108 for connecting Super I/O device 138. Super I/O device 138 is responsible for providing a number of I/O ports, including a keyboard port, a mouse port, a serial interface, a parallel port, and other types of input/output ports. The LPC interface may also connect a computer storage media such as a ROM or a flash memory such as a non-volatile random access memory (NVRAM) for storing firmware 136 that includes program code containing the basic routines that help to start up IHS 100 and to transfer information between elements within IHS 100. EFI firmware 136 comprises a firmware that is compatible with the EFI Specification and the Framework.

The LPC interface may also be utilized to connect NVRAM 137 to IHS 100. NVRAM 137 may be utilized by firmware 136 to store configuration data for IHS 100. In other embodiments, configuration data for IHS 100 may be stored on the same NVRAM 137 as the firmware 136.

BMC 132 may include non-volatile memory having program instructions stored thereon that enable remote management of IHS 100. For example, BMC 132 may enable a user to discover, configure, and manage IHS 100, setup configuration options, resolve and administer hardware or software problems, etc. Additionally or alternatively, BMC 132 may include one or more firmware volumes, each volume having one or more firmware files used by the BIOS' firmware interface to initialize and test components of IHS 100.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within IHS 100 from the factory.

It should be appreciated that, in other embodiments, IHS 100 may comprise other types of computing devices, including hand-held computers, embedded computer systems, personal digital assistants, and other types of computing devices. It is also contemplated that the IHS 100 may not include all of the components shown in FIG. 1, may include other components that are not explicitly shown in FIG. 1, or may utilize an architecture different than that shown in FIG. 1.

Figure 2:
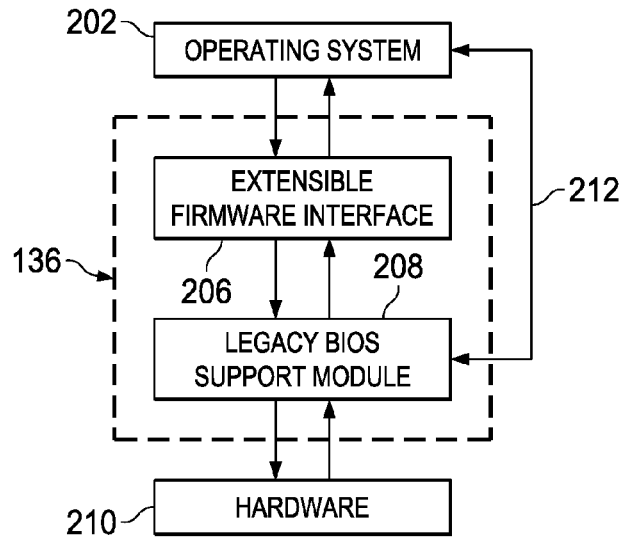
FIGS. 2 and 3 are block diagrams of examples of aspects of an Extensible Firmware Interface (EFI) environment utilized by systems and methods described herein according to some embodiments.

Referring now to FIG. 2, examples of aspects of an EFI environment created by EFI firmware 136 of IHS 100 are described according to some embodiments. As shown, firmware 136 comprises a firmware compatible with the EFI Specification from INTEL CORPORATION or from the UEFI FORUM. The EFI Specification describes an interface between OS 202 and system firmware 136; particularly, the EFI Specification defines the interface that platform firmware 136 implements, and the interface that OS 202 may use in booting.

According to an implementation of EFI, both EFI 206 and legacy BIOS support module 208 may be present in firmware 136. This allows IHS 100 to support both firmware interfaces. In order to provide this, interface 212 may be used by legacy OSs and applications. Additional details regarding the architecture and operation of the EFI 206 are provided below with respect to FIG. 3. Moreover, additional details regarding the operation and architecture of EFI can be found in the EFI Specification and the Framework, which are available from INTEL CORPORATION. As will be described in greater detail below, the EFI Framework also includes a Human Interface Infrastructure (HII) Specification.

Figure 3:
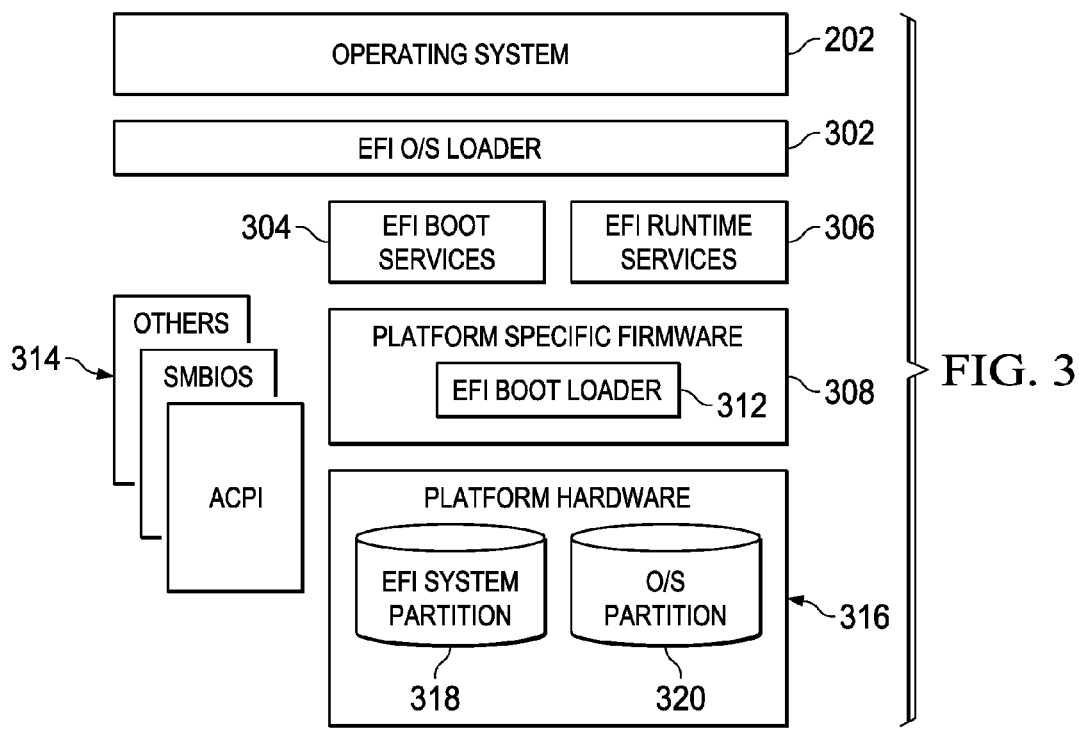

Turning now to FIG. 3, additional details regarding an EFI Specification-compliant system utilized to provide an operating environment for various embodiments are described. As shown in FIG. 3, the system includes platform hardware 316 and OS 202. Platform firmware 308 may retrieve an OS image from EFI system partition 318 using an EFI O/S loader 302. EFI system partition 318 may be an architecturally shareable system partition. As such, EFI system partition 318 defines a partition and file system that are designed to allow safe sharing of mass storage between multiple vendors. O/S partition 320 may also be utilized.

Once started, EFI O/S loader 302 continues to boot the complete OS 202. In doing so, EFI O/S loader 302 may use EFI boot services 304 and interface to other supported specifications to survey, comprehend, and initialize the various platform components and the operating system software that manages them. Thus, interfaces 314 from other specifications may also be present on the system. For example, the Advanced Configuration and Power Management Interface (ACPI) and the System Management BIOS (SMBIOS) specifications may be supported.

EFI boot services 304 provides interfaces for devices and system functionality that can be used during boot time. EFI runtime services 306 may also be available to the O/S loader 302 during the boot phase. For example, a minimal set of runtime services may be presented to ensure appropriate abstraction of base platform hardware resources that may be needed by the operating system 202 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 312 at system boot time. EFI boot loader 312 is a component in the EFI firmware that determines which program modules should be explicitly loaded and when. Once the EFI firmware is initialized, it passes control to boot loader 312. Boot loader 312 is then responsible for determining which of the program modules to load and in what order.

The various program modules executing within the EFI may have a need to receive user input or to display information on an output device, such as a display screen. In order to provide this functionality, EFI firmware 136 provides an HII database and an HII database driver that exposes methods for accessing the database through a HII database protocol interface. The HII database driver maintains the internal data structures for storing information in the HII database, and for providing access to input devices, forms, strings, and fonts stored in the HII database. According to embodiments described herein, the HII database driver may include an engine operative to create and use dependency matrices for managing dependencies for HII devices. Additional details regarding the structure and operation of the HII protocol are provided below with respect to FIG. 4.

Figure 4:
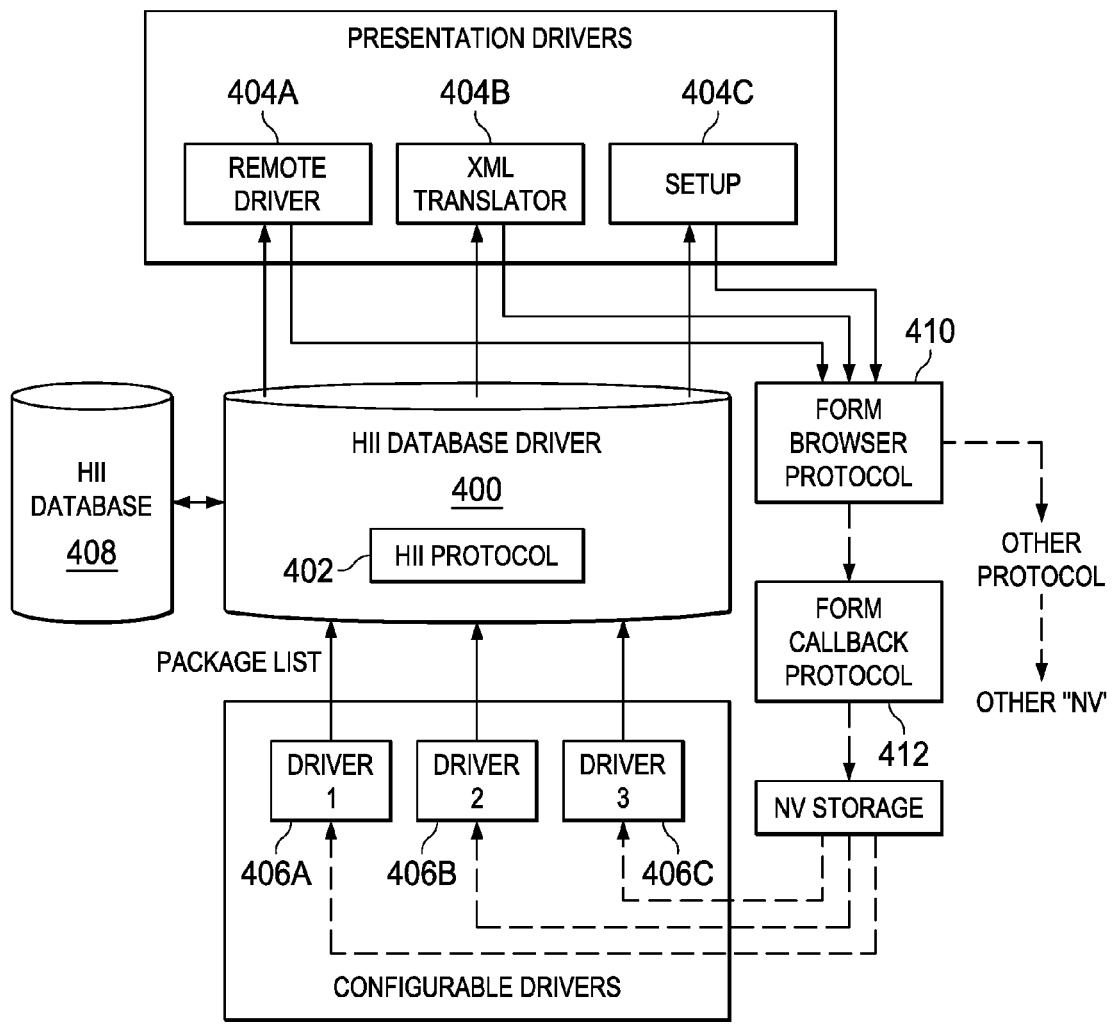
FIG. 4 is a block diagram of an example of aspects of a model utilized within the EFI environment to manage HII devices according to some embodiments.

Referring now to FIG. 4, an illustrative software model utilized inside the EFI framework to manage human interface components will be described. In particular, the software model shown in FIG. 4 is utilized to manage human interface data within an EFI environment. Human interface data may include fonts, strings, and forms. Each of these is represented by a variable length data structure known as a package (or a "pack"). The INTEL Platform Innovation Framework for EFI HII Specification defines the format for the human interface data and the packages that contain them.

During boot up of IHS 100 based upon the EFI framework, it may be necessary to display different kinds of data and, hence, display of this data is supported by the firmware 136. For instance, it may be desirable to display graphical displays, text, query and response dialog boxes, and setup information during the boot process. The human interface data necessary to display this information is submitted to HII database driver 400 for storage in HII database 408 by drivers 406A-406C executing within the EFI preboot environment.

In particular, packages are submitted to HII database driver 400 to be stored in HII database 408. Package lists may be submitted to HII database driver 400 that identify different packages to be stored in HII database 408. Different packages identified by the list are handled differently. Font packages are integrated into existing font data, thereby expanding the available font characters (also referred to herein as "glyphs"). String and form information is handled by assigning a handle to the "subdatabase." These handles are then used to refer to the packages by the drivers 406A-406C themselves, as well as other drivers, such as the presentation drivers 404A-404C, that make use of the information stored in HII database 408.

As shown in FIG. 4, HII database protocol 400 exposes HII database protocol interface 402. Protocol interface 402 is discoverable by other drivers executing within the EFI environment and provides an interface to the operations provided by HII database driver 400. Protocol interface 402 is compatible with the HII database protocol specified in the Framework.

A string package defines a list of strings in a particular language or a related set of languages. Numerous strings may exist in a single package to implement support for multiple language sets. A string is generally a C-style Unicode string, although it may contain special EFI-specific formatting characters as well. A string is referred to by a STRING_TOKEN, which is a constant usually assigned during the build process. A STRING_TOKEN is contained in a variable of type STRING_REF. The difference in the two makes it simpler to determine if an element is referring to a string or a container for a reference to a string. Packages are also defined by EFI for storing forms and fonts. Form browser protocol 410 and form callback protocol 412 are also defined by EFI for interacting with forms stored in HII database 408.

In some situations, systems and methods described herein may be used to manage dependencies among various configuration settings for HII devices that are coupled to an IHS, particularly when changes to those configuration settings are requested by a remote IHS via a BMC over a network. When configuration settings have dependencies, remote configuration tools need to honor those dependency relationships, and users interacting with the remote configuration tools need to understand how the settings are related.

In that regard, a number of types of dependencies among configuration settings are not supported by conventional solutions. In some cases the user has to execute multiple configurations jobs or have to use an IHS's local console to achieve the desired results; and, in cases when dependencies span for more than a single level, the behavior is not deterministic.

An example of a type of dependency requiring multiple jobs includes sibling dependencies among functions of a device. In this case, the state and value of an attribute on a multi-function device changes when an attribute value on same function or another function on the same device gets modified. Generally, single personality (FCoE or iSCSI) can only be enabled for a single function on a multi-function network device. In order to enable FCoE or iSCSI personality on a function, the user first needs to disable this personality on any other function on the device if enabled. This requires a system reboot to execute first job followed by another system reboot for second job as per current implementation: a first job disables the personality on one of the functions; and a second job enables the personality on one of the functions.

An example of a type of dependency that is not supported by conventional solutions include multi-level dependencies, and nested or chained parent dependencies. In the following discussion, the term "child" refers to an attribute that depends on the state or value of another attribute, and the term "parent" refers to an attribute on which a child attribute depends. Multi-level dependencies come into play when a child attribute has a parent that itself is a child attribute of another attribute due to dependency between them. State and value of a child attribute (grand child) changes when parent attribute (parent) value gets modified, whereas parent attribute (parent) state and value in turn depends on its parent attribute (grandparent) value. Similarly, nested parent dependencies come into play when a child attribute has more than one parent. Additionally, parent attributes have child-parent relationship within themselves. State and value of child attribute changes when either of the two parent attributes (P1, P2) value gets modified. One of the parent attributes (P1) state and value in turn depends on another parent (P2) value.

Existing HII validation engines fall short of providing a comprehensive user experience while performing moderate or complex configuration settings on HII devices. For instance, conventional methods of conveying dependencies from an HII formset to the validation engine are inapt and cannot scale beyond certain predefined types of dependencies. Also, the performance of conventional validation engines degrade as the complexity of dependencies increases and the number of configuration settings on the device multiplies. When dependency validation fails, these conventional validation engines cannot convey the exact reason for not allowing the new set of configuration settings. Furthermore, conventional engines do not provide entire configuration preview until the changes are applied on to the device.

To address these, and other problems, a dependency matrix may be created that captures all the valid configuration setting (or attribute) states and evaluates dependencies for each state. The engine that creates the matrix uses the HII formset data from all HII-aware devices. The dependency matrix may comprise smaller data tables, where each table defines the dependency relationships for one child attribute. Again, settings on which the child attribute depends are called "parent attributes." Each attribute—child or parent—includes a name and a value. When creating the matrix, the engine detects each parent-child relationship in the HII formset data, and then determines the resulting state of the child attribute for each combination of parent values. The engine also determines cases where the child attribute is forced to a certain value based on the parent values.

The matrix may be stored in persistent storage, and accessed by BMC 132 whenever dependency information is needed. In this way, remote or out-of-band (OOB) applications can utilize the dependency matrix, making sure the values applied to settings/attributes are appropriate and correct. If a remote or OOB user requests an invalid combination of settings, applications can use the matrix to explain why the combination is invalid, and/or propose a valid combination of settings to the user. An application may also use the matrix to accept a user's configuration request by forcing other attributes to values that accommodate the user's request.

To better illustrate the foregoing, FIG. 5 is a block diagram of a system for managing dependencies for HII devices according to some embodiments. Particularly, CPU 102 executes EFI firmware 136, which in turn includes validation or dependency engine 500. In operation, dependency engine 500 may collect HII formset data from HII devices 501A-N and may extract attributes from that data, as well as hierarchical relationships between those attributes. Additionally or alternatively, dependency engine 500 may test one or more of HII devices 501A-N to evaluate those relationships.

Dependency engine 500 then stores the resulting dependency matrix, which may include a plurality of tables (e.g., one for each child attribute) in dependency database 502, and which may be stored in any memory within the IHS that is accessible to BMC 132. Within BMC 132, job manager 503 may include a plurality of job handlers 504, one for each request received at BMC 132 (e.g., from a remote IHS) for a configuration change. Job manager 503 may evaluate each request against dependency database 502, and may respond to the request as appropriate.

FIG. 6 is a block diagram of an example of a method for creating a dependency matrix for HII devices. In various embodiments, method 600 may be performed, at least in part, by EFI firmware 136. At block 601, method 600 restarts IHS 100. At block 602, method 600 collects HII formset data from HII devices 501A-N. At block 603, method 600 extracts attributes (that is, configuration settings) from that data, as well as hierarchical relationships between those attributes. At block 604, method 600 creates one or more tables for each attribute, the tables forming a dependency matrix. Then, at block 605, method 600 stores the dependency matrix in a memory.

FIG. 7 is a flowchart of an example of a method for using a dependency matrix for HII devices according to some embodiments. In various embodiments, method 700 may be performed, at least in part, by BMC 132. At block 701, method 700 includes receiving a request to change a configuration setting; that is, to change a value of a given attribute. At block 702, method 700 uses dependency database 502 to evaluate the request. Examples of this evaluation are provided below.

At block 703, method 700 determines whether the requested change is allowed. If so, block 704 effects the change and notifies the requestor that the change has been effected. Otherwise, at block 705, method 700 transmits a response to the user of the remote IHS explaining reason(s) why the configuration change is not allowed. Then, at block 706, method 700 may optionally propose alternative changes (e.g., changes to another attribute) that may achieve the same or similar results as the original configuration change request, but that are allowed by the dependencies expressed in the dependency matrix.

Example I—Sibling Dependency Between Partitions on a Device

A "sibling dependency" refers to the case where an attribute depends on another attribute in a different device or a different function within the same device. For example, suppose a partitioned NIC has four partitions, where each partition has attributes for NicMode, iScsiOffloadMode, and FcoeOffloadMode. The table below expresses the dependency relationships for the child attribute "FcoeOffloadMode" on partition 2:

TABLE I

| Sibling Name | Sibling Value | Sibling Partition | Child Name | Child Value | Child State | Child Partition | Operator |
| --- | --- | --- | --- | --- | --- | --- | --- |
| NicMode | Enabled | 2 | FcoeOffloadMode | Disabled | R/W | 2 | OR |
| iScsiOffloadMode | Enabled | 2 | FcoeOffloadMode | Disabled | R/W | 2 | OR |

TABLE I-continued

| Sibling Name | Sibling Value | Sibling Partition | Child Name | Child Value | Child State | Child Partition | Operator |
|---|---|---|---|---|---|---|---|
| FcoeOffloadMode | Enabled | 1 | FcoeOffloadMode | N/A | RO | 2 | OR |
| FcoeOffloadMode | Enabled | 3 | FcoeOffloadMode | N/A | RO | 2 | OR |
| FcoeOffloadMode | Enabled | 4 | FcoeOffloadMode | N/A | RO | 2 | OR |
| FcoeOffloadMode | Disabled | 1 | FcoeOffloadMode | N/A | R/W | 2 | AND |
| FcoeOffloadMode | Disabled | 3 | FcoeOffloadMode | N/A | R/W | 2 | AND |
| FcoeOffloadMode | Disabled | 4 | FcoeOffloadMode | N/A | R/W | 2 | AND |

Particularly, Table I shows that the state of the child attribute is read-only (RO) when: FcoeOffloadMode is enabled on partition 1, OR FcoeOffloadMode is Enabled on partition 3, OR FcoeOffloadMode is enabled on partition 4. Table I also shows that the state of the child attribute is read-write (RW) when: NicMode (partition 2) is enabled, OR iScsiOffloadMode (partition 2) is enabled, OR FcoeOffloadMode (partition 1) is disabled AND FcoeOffloadMode (partition 3) is disabled AND FcoeOffloadMode (partition 4) is disabled.

Further, notice that the first two rows of Table I provide a child value. This shows that the child attribute "FcoeOffloadMode (partition 2)" is forced to disabled when: NicMode (partition 2) is enabled, OR iScsiOffloadMode (partition 2) is enabled.

In previous solutions, two subsequent configuration jobs involving 4 reboots would be needed to enable FcoeOffloadMode on partition 2, because the job manager 503 was unaware of the dependency relationship (in this case, a "sibling dependency). A first job would be needed to disable FcoeOffloadMode on the partition where it is enabled, and a second job to enable FcoeOffloadMode on partition 2. This solution enables both jobs to be executed on a single run involving 2 reboots, thus saving 50% of the time required to apply these settings.

Example II—Multi-Level Dependency

As an example of multi-level dependency, the CollaborativeCpuPerfCtrl attribute is dependent on the ProcPwrPerf attribute, and the ProcPwrPerf attribute is dependent on the SysProfile attribute, as shown in tables II and III below:

TABLE II

| Parent Attribute | Parent Value | Child Attribute | Child Value | Child State | Child Suppressed |
|---|---|---|---|---|---|
| ProcPwrPerf | SysDbpm | CollaborativeCpuPerfCtrl | Enabled | RO | N/A |
| ProcPwrPerf | MaxPerf | CollaborativeCpuPerfCtrl | N/A | RW | N/A |
| ProcPwrPerf | OsDbpm | CollaborativeCpuPerfCtrl | N/A | RW | N/A |

TABLE III

| Parent Attribute | Parent Value | Child Attribute | Child Value | Child State | Child Suppressed |
|---|---|---|---|---|---|
| SysProfile | PerfPerWattOptimizedOs | ProcPwrPerf | OsDbpm | RO | No |
| SysProfile | PerfPerWattOptimizedDapc | ProcPwrPerf | SysDbpm | RO | No |
| SysProfile | PerfOptimized | ProcPwrPerf | MaxPerf | RO | No |
| SysProfile | DenseCfgOptimized | ProcPwrPerf | SysDbpm | RO | No |
| SysProfile | Custom | ProcPwrPerf | N/A (value not forced) | RW | No |

According to tables II and III, CollaborativeCpuPerfCtrl is forced to enabled and Read Only State is True, when ProcPwrPerf is equal to SysDbpm. ProcPwrPerf's read-only state (RO) is read/write (RW) only when SysProfile is set to custom. Else, ProcPwrPerf stays in an RO state. Also, ProcPwrPerf is forced to SysDbpm when SysProfile is set to PerfPerWattOptimizedDapc and DenseCfgOptimized. The suppressed column indicates whether the child attribute is shown via a user interface, or whether that child attribute is suppressed (hidden).

As an example, assume a situation where a user wants to change the CollaborativeCpuPerfCtrl setting or attribute, which is set to Enabled but is in a read-only state. For the change to CollaborativeCpuPerfCtrl to take place, CollaborativeCpuPerfCtrl must be changed to a read/write state. To evaluate whether the change to RW is possible, table II indicates that CollaborativeCpuPerfCtrl depends upon ProcPwrPerf, which currently holds the SysDbpm value (row 2), thus causing CollaborativeCpuPerfCtrl to have an RO state, but may alternatively be made to hold a MaxPerf value (row 3) or an OsDbpm value (row 4), which would then put CollaborativeCpuPerfCtrl in the desired RW state. For ProcPwrPerf to maintain a SysDbpm value, Table III indicates that the ProcPwrPerf attribute further depends upon the SysProfile attribute, which must be set to a custom value in order for ProcPwrPerf to be in an RW state. Thus, in order to effect the requested change to put CollaborativeCpuPerfCtrl in an RW state, SysProfile must be changed to Custom and ProcPwrPerf must be changed either to MaxPerf or OsDbpm.

Example III—Nested (Chained) Dependency

In tables IV and V, PxeDevVLanId is dependent on PxeDevVLanEnDis and PxeDevEnDis. Additionally, PxeDevVLanEnDis is dependent on PxeDevEnDis, making it nested or chained dependencies that are not supported by conventional validation engines. Moreover, PxeDevVLanId's RO state is true if either PxeDevVLanEnDis or PxeDevEnDis is disabled, and PxeDevVLanEnDis's RO state is true if PxeDevEnDis is disabled.

TABLE IV

| Parent Attribute | Parent Value | Child Attribute | Child Value | Child State | Child Suppressed |
|---|---|---|---|---|---|
| PxeDevVLanEnDis | Disabled | PxeDevVLanId | N/A | RO | N/A |
| PxeDevVLanEnDis | Enabled | PxeDevVLanId | N/A | RW | N/A |
| PxeDevEnDis | Disabled | PxeDevVLanId | N/A | RO | N/A |
| PxeDevEnDis | Enabled | PxeDevVLanId | N/A | RW | N/A |

TABLE V

| Parent Attribute | Parent Value | Child Attribute | Child Value | Child State | Child Suppressed |
|---|---|---|---|---|---|
| PxeDevEnDis | Disabled | PxeDevVLanEnDis | N/A | RO | N/A |
| PxeDevEnDis | Enabled | PxeDevVLanEnDis | N/A | RW | N/A |

In sum, the systems and methods described herein offer unique features over conventional validation methods. For example, the systems and methods described herein provide dependency information about configuration settings to remote configuration applications by determining, by an IHS, a matrix of potential results for each dependency expression in HII data (including both embedded and 3$^{rd}$ party devices), and storing these results in non-volatile memory that is accessible remotely (over a communication channel with the host) and out-of-band (when the host processor is not online, but a BMC is).

The matrix of potential results may specify the resulting state (read/write or read-only) of the dependent configuration setting (i.e., the "child"). The matrix of potential results specifies the resulting value of the dependent configuration setting (i.e. the "child"). When a user's desired configuration does not satisfy a dependency expression, the remote configuration tool can use the result matrix to provide the reason why the user's desired configuration is not allowed. Additionally or alternatively, when a user's desired configuration does not satisfy a dependency expression, the remote configuration tool can use the result matrix to propose alternate configurations that satisfy the dependency expression.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a host processor; and
a Baseboard Management Controller (BMC) coupled to the host processor, the BMC having program instructions stored thereon that, upon execution by the BMC, cause the BMC to:
receive, from another IHS remotely located with respect to the IHS, a request to change a first value of a first one of a plurality of hardware attributes of a Human Interface Infrastructure (HII) device coupled to the IHS;
identify a dependency relationship between the first hardware attribute of the HII device and a second hardware attribute of the HII device;
determine whether the request is allowed based upon the dependency relationship; and
at least one of: (i) effect the change and notify the other IHS that the change has been allowed, or (ii) not effect the change and transmit a response to the other IHS explaining a reason why the change is not allowed.

2. The IHS of claim 1, wherein to identify the dependency relationship, the program instructions, upon execution, further cause the BMC to inspect a dependency matrix comprising a plurality of rows, wherein a given one of the plurality of rows identifies the first hardware attribute, the first value of the first hardware attribute, the second hardware attribute, and a second value of the second hardware attribute.

3. The IHS of claim 2, wherein the given row further indicates a read-only state or a read/write state of the second hardware attribute when the first hardware attribute has the first value changed by the request.

4. The IHS of claim 2, wherein the dependency relationship is selected from the group consisting of: a sibling dependency, a multi-level dependency, and a nested dependency.

5. The IHS of claim 2, wherein the first and second values are selected from the group consisting of: enabled, and disabled.

6. The IHS of claim 5, wherein the dependency matrix further identifies a Boolean relationship between the given row and a subsequent row.

7. The IHS of claim 6, wherein the program instructions, upon execution, further cause the IHS to: transmit a response to the request identifying another change to a third value of a third hardware attribute present in the subsequent row of the dependency matrix reduce a number of reboots necessary to fulfill the request.

8. The IHS of claim 6, wherein the program instructions, upon execution, further cause the IHS to: transmit a response to the request suggesting a change to a different hardware attribute.

9. The IHS of claim 1, wherein the first hardware attribute is selected from the group consisting of: a network interface card (NIC) mode, an Internet Small Computer System Interface (iSCSI) offload mode, and a Fibre Channel over Ethernet (FCoE) offload mode.

10. The IHS of claim 1, wherein the first hardware attribute is a Fibre Channel over Ethernet (FCoE) mode of a first network interface card (NIC) partition of the HII device, and wherein the second hardware attribute is an FCoE mode of a second NIC partition of the HII device.

11. The IHS of claim 1, wherein the first hardware attribute is a Power and Performance Management (ProcPwrPerf) attribute, and wherein the second hardware attribute is a collaborative CPU performance control (CollaborativeCpuPerfCtrl) attribute.

12. The IHS of claim 1, wherein the first hardware attribute is a system profile (SysProfile) attribute and wherein the second hardware attribute is a Power and Performance Management (ProcPwrPerf) attribute.

13. A Basic I/O System (BIOS) having program instructions stored thereon that, upon execution by a host processor of an Information Handling System (IHS), cause the IHS to:
  receive, from another IHS remotely located with respect to the IHS, a request to change a first value of a first one of a plurality of hardware attributes of a Human Interface Infrastructure (HII) device coupled to the IHS;
  identify a dependency relationship between the first hardware attribute of the HII device and a second hardware attribute of the HII device;
  determine whether the request is allowed based upon the dependency relationship; and
  at least one of: (i) effect the change and notify the other IHS that the change has been allowed, or (ii) not effect the change and transmit a response to the other IHS explaining a reason why the change is not allowed.

14. In an Information Handling System (IHS), a method comprising:
  receiving, from another IHS remotely located with respect to the IHS, a request to change a first value of a first one of a plurality of hardware attributes of a Human Interface Infrastructure (HII) device coupled to the IHS;
  identifying a dependency relationship between the first hardware attribute of the HII device and a second hardware attribute of the HII device;
  determining whether the request is allowed based upon the dependency relationship; and
  at least one of: (i) effecting the change and notifying the other IHS that the change has been allowed, or (ii) not effecting the change and transmitting a response to the other IHS explaining a reason why the change is not allowed.

* * * * *